United States Patent
Twigg

(10) Patent No.: US 7,516,548 B2
(45) Date of Patent: Apr. 14, 2009

(54) METHOD OF MANUFACTURING A FIBRE REINFORCED METAL MATRIX COMPOSITE ARTICLE

(75) Inventor: Edwin S Twigg, Derby (GB)

(73) Assignee: Rolls-Royce plc, London (GB)

( * ) Notice: Subject to any disclaimer, the term of this patent is extended or adjusted under 35 U.S.C. 154(b) by 636 days.

(21) Appl. No.: 10/988,640

(22) Filed: Nov. 16, 2004

(65) Prior Publication Data

US 2005/0166386 A1    Aug. 4, 2005

(30) Foreign Application Priority Data

Nov. 20, 2003    (GB) ................................. 0327002.2

(51) Int. Cl.
| | |
|---|---|
| B21D 53/78 | (2006.01) |
| B21K 3/04 | (2006.01) |
| B23P 15/02 | (2006.01) |
| B23P 15/04 | (2006.01) |

(52) U.S. Cl. ..................... 29/889.71; 29/889.2; 29/423; 29/458; 228/165; 228/180.5; 228/234.1; 228/246

(58) Field of Classification Search ................. 228/165, 228/174, 180.5, 245, 246, 234.1; 29/889.71, 29/889.7, 889.2, 419.2, 423, 458

See application file for complete search history.

(56) References Cited

U.S. PATENT DOCUMENTS

| | | | | |
|---|---|---|---|---|
| 3,567,407 | A * | 3/1971 | Yoblin | 428/614 |
| 3,609,855 | A * | 10/1971 | Schmidt | 228/178 |
| 3,622,283 | A * | 11/1971 | Sara | 428/608 |
| 3,828,417 | A * | 8/1974 | Divecha | 29/419.1 |
| 3,847,558 | A * | 11/1974 | Trabocco et al. | 428/614 |
| 3,864,807 | A * | 2/1975 | Schneider et al. | 148/530 |
| 3,894,677 | A * | 7/1975 | La Iacona | 228/190 |
| 4,115,611 | A * | 9/1978 | Stoltze et al. | 428/174 |
| 4,900,599 | A * | 2/1990 | Doble | 428/64.1 |
| 4,919,594 | A * | 4/1990 | Wright et al. | 416/230 |
| 4,934,581 | A * | 6/1990 | Ibe et al. | 228/190 |
| 5,184,769 | A * | 2/1993 | Moracz et al. | 228/121 |
| 5,289,967 | A * | 3/1994 | Bampton et al. | 228/190 |
| 5,946,801 | A * | 9/1999 | Twigg et al. | 29/889.71 |
| 5,967,400 | A * | 10/1999 | Bell et al. | 228/124.5 |
| 6,471,800 | B2 * | 10/2002 | Jang et al. | 156/58 |
| 6,658,715 | B1 * | 12/2003 | Podesta' | 29/419.1 |
| 6,786,389 | B2 * | 9/2004 | Pursell | 228/165 |

(Continued)

FOREIGN PATENT DOCUMENTS

EP    418843 A1 *    3/1991

(Continued)

*Primary Examiner*—Essama Omgba
(74) *Attorney, Agent, or Firm*—W. Warren Taltavull; Manelli Denison & Selter PLLC

(57) ABSTRACT

A method of manufacturing a fibre reinforced metal matrix composite article, the method comprising placing metal coated (18) fibers (14) between a first metal ring (30) and a second metal ring (36). Each of the metal-coated (18) fibres (14) having a glue (22) to hold the metal-coated (18) fibers (14) in position. A solvent is supplied to the glue (22) on the metal-coated (18) fibers (14) to soften the glue (22) and pressure is applied to allow the metal-coated (18) ceramic fibers (14) to become more closely packed. Thereafter the glue (22) is removed and the metal coated (18) fibers (14) and first and second metal rings (30, 36) are consolidated and diffusion bonded together.

32 Claims, 3 Drawing Sheets

U.S. PATENT DOCUMENTS

| | | | |
|---|---|---|---|
| 7,325,306 B2 * | 2/2008 | Twigg | 29/889.71 |
| 7,343,677 B2 * | 3/2008 | Twigg | 29/889.71 |
| 2003/0017053 A1 * | 1/2003 | Baldwin et al. | 416/229 A |
| 2003/0029904 A1 | 2/2003 | Pursell | |

FOREIGN PATENT DOCUMENTS

| | | |
|---|---|---|
| EP | 0490639 A | 6/1992 |
| EP | 0 831 154 A | 3/1998 |
| EP | 0831154 A | 3/1998 |
| EP | 0 908 263 A | 4/1999 |
| EP | 1 288 324 A | 3/2003 |
| EP | 1306459 A | 5/2003 |
| GB | 2 089 410 A | 6/1982 |

\* cited by examiner

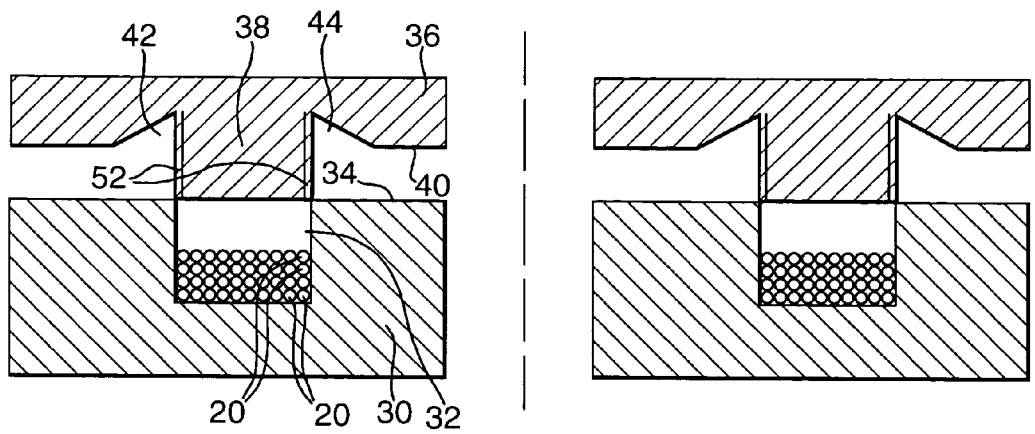
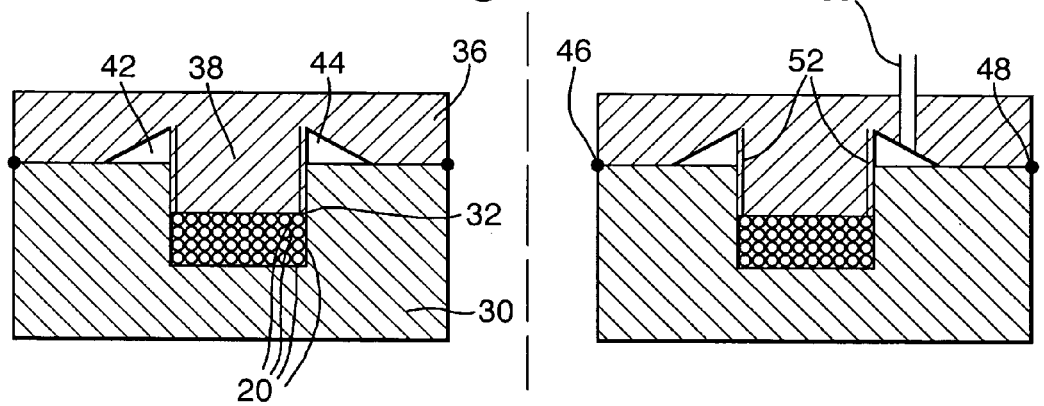
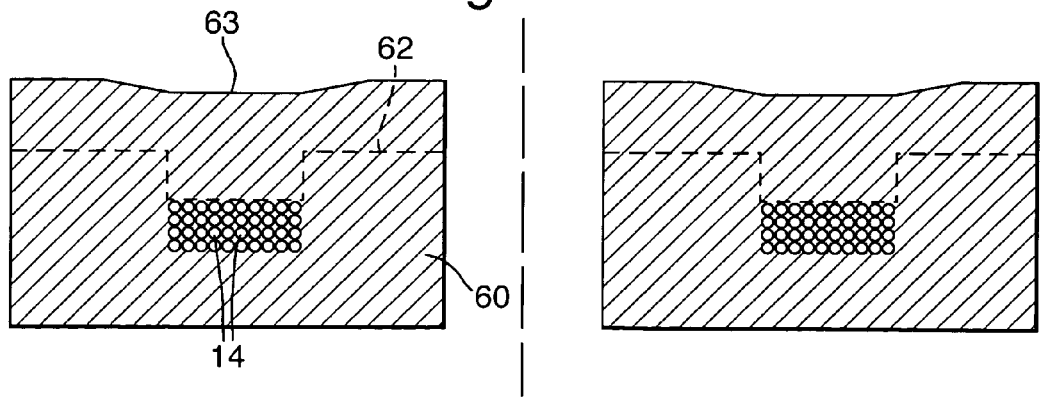

METHOD OF MANUFACTURING A FIBRE REINFORCED METAL MATRIX COMPOSITE ARTICLE

FIELD OF THE INVENTION

The present invention relates to a method of manufacturing a fibre reinforced metal matrix composite article, and the present invention relates in particular to a method of manufacturing a fibre reinforced metal matrix composite rotor, for example a compressor rotor or turbine rotor.

BACKGROUND OF THE INVENTION

In one known method of manufacturing a fibre reinforced metal matrix composite article, as disclosed in European patent No. EP0831154B1, a plurality of metal-coated fibres are placed in an annular groove in a metal ring and a further metal ring is placed on top of the metal-coated fibres. Each of the metal-coated fibres is wound spirally in a plane and the metal-coated fibre spirals are stacked in the annular groove in the metal ring. The metal rings are pressed predominantly axially to consolidate the assembly and to diffusion bond the metal rings and the metal coated fibre spirals together to form an integral structure.

In a further known method of manufacturing a fibre reinforced metal matrix composite article, as disclosed in European patent application No. EP1288324A2, the arrangement described in EP0831154B1 is modified by the inclusion of metal wires in the annular groove in the metal ring with the metal-coated fibres. Each of the metal wires is wound spirally in a plane and the metal wire spirals are stacked in the annular groove in the metal ring with the metal-coated fibre spirals.

In these methods of manufacturing a fibre reinforced metal matrix composite the metal coated fibres, or the metal coated fibres and metal wires, are wound spirally in a plane on a former and the metal coated fibre spirals, or metal coated fibre spirals and metal wire spirals, are temporarily held together with a glue to enable the metal coated fibre spirals, or metal coated fibre spirals and metal wire spirals, to be assembled in the annular groove in the metal ring. The glue is applied locally to the metal-coated fibre spirals, or metal coated fibre spirals and metal wire spirals.

Due to necessary clearances and slight variation in the diameter of the fibres or fibres and wires, the metal coated fibre spirals, or metal coated fibre spirals and metal wire spirals are not perfectly flat, i.e. adjacent metal coated fibres, or metal coated fibres and metal wires, are slightly out of plane. As a result the spirals are not ideally packed during the dry assembly of the spirals in the annular groove in the metal ring and this leaves undesirable excess free space between the metal-coated fibres. The excess free space means that the confronting faces of the metal rings will not abut each other and it is not possible to seal the assembly. It is then necessary to provide a deeper annular groove in the metal ring in order to allow the confronting faces of the metal rings to abut each other. An increase in the depth of the annular groove is undesirable because the further metal ring has to be moved a greater distance to achieve consolidation. Additionally, the excess free space allows the metal coated fibres to move out of position and may even allow some of the metal coated fibres to cross other metal coated fibres and this may results in breaking of the metal coated fibres during processing, essentially creating material defects.

SUMMAARY OF THE INVENTION

Accordingly the present invention seeks to provide a novel method of manufacturing a fibre reinforced metal matrix composite article.

Accordingly the present invention provides a method of manufacturing a fibre reinforced metal matrix composite article, the method comprising the steps of:

(a) forming a first metal component,
(b) forming a second metal component,
(c) forming at least one fibre preform, the fibre preform comprising at least one fibre, applying a glue to the fibre preform to hold the at least one fibre in position,
(d) softening the glue on the at least one fibre preform and simultaneously pressing the at least one fibre preform to increase the packing density of the at least one fibre preform,
(e) placing the at least one fibre preform and filler metal between the first metal component and the second metal component,
(f) sealing the second metal component to the first metal component,
(g) removing the glue from the at least one fibre preform,
(h) applying heat and pressure such to consolidate the at least one fibre preform and the filler metal and to diffusion bond the filler metal, the first metal component and the second metal component to form a unitary composite component.

Preferably step (a) comprises forming a circumferentially extending groove in a face of the first metal member, placing at least one circumferentially extending fibre preform and the filler metal in the circumferentially extending groove of the first metal component and placing the second metal component in the groove of the first metal component.

Preferably step (b) comprises forming a projection on the second metal component and step (e) comprises placing the projection of the second metal component in the groove of the first metal component.

Preferably step (a) comprises forming a circumferentially extending groove in a face of the first metal member, placing at least one circumferentially extending fibre preform and the filler metal in the circumferentially extending groove of the first metal component and placing the second metal component in the groove of the first metal component.

Preferably step (d) comprises softening the glue by introducing a solvent into the fibre preform.

Preferably step (d) comprises softening the glue by introducing a small quantity of liquid solvent into the fibre preform.

Alternatively step (d) comprises softening the glue by flowing a liquid solvent, or a vaporised solvent, through the fibre preform.

Alternatively step (d) comprises softening the glue by heating the first and second metal components.

Alternatively step (d) comprises softening the glue by flowing a hot fluid through the fibre preform.

Preferably the at least one fibre is a silicon carbide fibre, a silicon nitride fibre, a boron fibre or an alumina fibre.

Preferably the at least one fibre is a metal coated fibre.

Preferably the at least one metal coated fibre is a titanium coated fibre, a titanium aluminide coated fibre or a titanium alloy coated fibre.

Preferably step (c) comprises winding at least one fibre on a former to form a spiral fibre preform, applying a glue to the spiral fibre preform to hold the at least one fibre in position and removing the spiral fibre preform from the former.

Preferably step (c) comprises winding a plurality of fibres on a former to form a plurality of spiral fibre preforms, applying a glue to each spiral fibre preform to hold each fibre in position and removing each spiral fibre preform from the former.

Preferably the filler metal comprises at least metal wire and the method comprises winding at least one metal wire on a former to form a spiral wire preform, applying a glue to the spiral wire preform to hold the at least one metal wire in position and removing the second spiral wire preform from the former.

Preferably the at least one metal wire is a titanium wire, a titanium aluminide wire or a titanium alloy wire.

Preferably the method includes winding a plurality of metal wires on a former to form a plurality of spiral fibre preforms, applying a glue to each spiral fibre preform to hold each metal wire in position and removing each spiral fibre preform from the former.

The present invention also provides a method of manufacturing a fibre reinforced metal matrix composite article, the method comprising the steps of:
(a) forming a circumferentially and axially extending groove in an face of a first metal component,
(b) forming a circumferentially and axially extending projection on an face of a second metal component,
(c) winding at least one fibre on a former to form a spiral fibre preform, applying a glue to the spiral fibre preform to hold the at least one fibre in position and removing the spiral fibre preform from the former,
(d) arranging the at least one spiral fibre preform and filler metal in the circumferentially and axially extending groove in the first metal component,
(e) placing the circumferentially and axially extending projection on the second metal component in the circumferentially and axially extending groove in the first metal component,
(f) softening the glue on the at least one spiral fibre preform and simultaneously pressing the circumferentially and axially extending projection on the second metal component into the circumferentially and axially extending groove in the first metal component to increase the packing density of the at least one spiral fibre preform,
(g) sealing the second metal component to the first metal component,
(h) removing the glue from the at least one spiral fibre preform,
(i) applying heat and pressure such that the circumferentially and axially extending projection moves into the circumferentially and axially extending groove to consolidate the at least one spiral preform and the filler metal and to diffusion bond the filler metal, the first metal component and the second metal component to form a unitary composite component.

Preferably step (f) comprises introducing a solvent into the circumferentially and axially extending groove in the first metal component to soften the glue.

Preferably step (f) comprises introducing a small quantity of liquid solvent into the circumferentially and axially extending groove in the first metal component.

Alternatively step (f) comprises flowing a liquid solvent, or a vaporised solvent, through the circumferentially and axially extending groove in the first metal component.

Alternatively step (f) comprises heating the first and second metal components to soften the glue.

Alternatively step (f) comprises flowing a hot fluid though the circumferentially and axially extending groove in the first metal component to soften the glue.

Preferably the at least one fibre is a silicon carbide fibre, a silicon nitride fibre, a boron fibre or an alumina fibre.

Preferably the at least one fibre is a metal coated fibre.

Preferably the at least one metal coated fibre is a titanium coated fibre, a titanium aluminide coated fibre or a titanium alloy coated fibre.

Preferably (c) comprises winding a plurality of fibres on a former to form a plurality of spiral fibre preforms, applying a glue to each spiral fibre preform to hold each fibre in position and removing each spiral fibre preform from the former.

Preferably the filler metal comprises at least metal wire and the method comprises winding at least one metal wire on a former to form a spiral wire preform, applying a glue to the spiral wire preform to hold the at least one metal wire in position and removing the second spiral wire preform from the former.

Preferably the at least one metal wire is a titanium wire, a titanium aluminide wire or a titanium alloy wire.

Preferably the method includes winding a plurality of metal wires on a former to form a plurality of spiral fibre preforms, applying a glue to each spiral fibre preform to hold each metal wire in position and removing each spiral fibre preform from the former.

Preferably the first metal component and the second metal component comprise titanium, titanium aluminide or titanium alloy.

BRIEF DESCRIPTION OF THE DRAWINGS

The present invention will be more fully described by way of example with reference to the accompanying drawings in which:

FIG. 4 is a longitudinal, axial, cross-sectional view through an assembly of fibre preforms positioned between first and second metal rings.

FIG. 7 is a longitudinal, axial, cross-sectional view through the assembly of fibre preforms positioned between first and second metal rings after welding together.

FIG. 8 is a longitudinal, axial, cross-sectional view through the assembly of fibre preforms positioned between first and second metal rings after consolidation and bonding to form a unitary composite article.

DETAILED DESCRIPTION OF THE INVENTION

Figure 1:
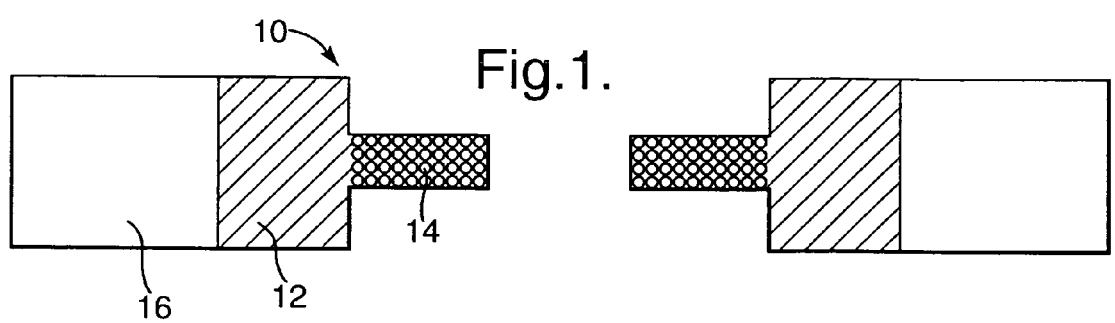
FIG. 1 is a longitudinal, axial, cross-sectional view through a bladed compressor rotor made according to the method of the present invention.

A finished ceramic fibre reinforced metal rotor 10 with integral rotor blades is shown in FIG. 1. The rotor 10 comprises a metal ring 12, which includes a ring of circumferentially extending reinforcing ceramic fibres 14, which are embedded in the metal ring 12. A plurality of solid metal rotor blades 16 are circumferentially spaced on the metal ring 12 and extend radially outwardly from and are integral with the metal ring 12.

Figure 2:
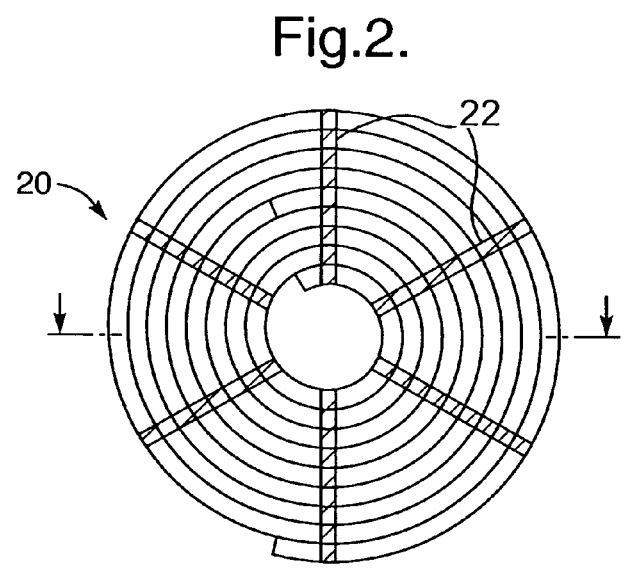
FIG. 2 is a plan view of a fibre preform used in the method of the present invention.
Figure 3:
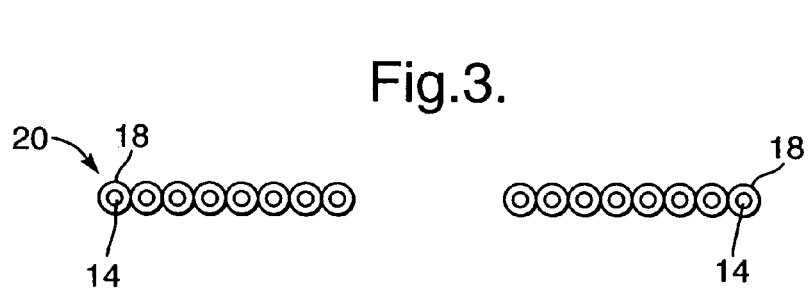
FIG. 3 is a cross-sectional view through the preform shown in FIG. 2.

A ceramic fibre reinforced metal rotor 10 is manufactured using a plurality of metal-coated ceramic fibres. Each ceramic fibre 14 is coated with metal matrix 18 by any suitable method, for example physical vapour deposition, sputtering etc. Each metal-coated 18 ceramic fibre 14 is wound around a mandrel to form an annular, or disc shaped, fibre preform 20 as shown in FIGS. 2 and 3. Each annular, or disc shaped, fibre preform 20 thus comprises a single metal coated ceramic fibre 14 arranged in a spiral with adjacent turns of the spiral abutting each other. A glue 22 is applied to the annular, or disc shaped, fibre preform 20 at suitable positions to hold the turns of the spiral together. The glue is selected such that it may be completely removed from the annular, or disc shaped, fibre preform 20 prior to consolidation. The glue 22 may be for example polymethyl-methacrylate in dichloromethane or Perspex (RTM) in dichloromethane.

A first metal ring, or metal disc, 30 is formed and an annular axially extending groove 32 is machined in one radially extending and axially facing face 34 of the first metal ring 30, as shown in FIG. 4. The annular groove 32 has straight parallel sides, which form a rectangular cross-section. A second metal ring, or metal disc, 36 is formed and an annular axially extending projection 38 is machined from the second metal ring, or metal disc, 36 such that it extends from one radially extending and axially facing face 40 of the second metal ring, or metal disc 36. The second metal ring, or metal disc, 36 is also machined to form two annular grooves 42 and 44 in the face 40 of the second metal ring, or metal disc 36. The annular grooves 42 and 44 are arranged radially on opposite sides of the annular projection 38 and the annular grooves 42 and 44 are tapered radially from the face 40 to the base of the annular projection 38. It is to be noted that the radially inner and outer dimensions, diameters, of the annular projection 38 are substantially the same as the radially inner and outer dimensions, diameters, of the annular groove 32.

One or more of the annular fibre preforms 20 are positioned coaxially in the annular groove 32 in the face 34 of the first metal ring 30. The radially inner and outer dimensions, diameters, of the annular fibre preforms 20 are substantially the same as the radially inner and outer dimension, diameters, of the annular groove 32 to allow the annular fibre preforms 20 to be loaded into the annular groove 32 while substantially filling the annular groove 32. A sufficient number of annular fibre preforms 20 are stacked in the annular groove 32 to partially fill the annular groove 32 to a predetermined level, as shown in FIG. 4.

The second metal ring 36 is then arranged such that the face 40 confronts the face 34 of the first metal ring 30 and the axes of the first and second metal rings 30 and 36 are aligned such that the annular projection 38 on the second metal ring 36 aligns with the annular groove 32 in the first metal ring 30. The second metal ring 36 is then pushed towards the first metal ring 30 such that the annular projection 38 enters the annular groove 32.

Figure 5:
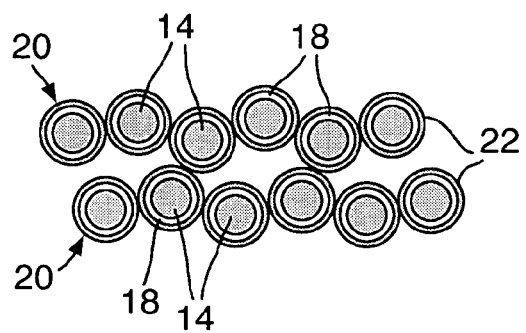
FIG. 5 is an enlarged cross-sectional view through the fibre preforms shown in FIG. 4 before softening of the glue.

The annular fibre preforms 20 are not locally perfectly flat, i.e. adjacent turns of the metal coated ceramic fibre 14 are slightly out of plane due to necessary clearances and slight variation in the diameter of the metal coated ceramic fibre 14, see FIG. 5. Consequently, the annular fibre preforms 20 are not ideally packed in the annular groove 32 and thus there are undesirable excess free spaces, which will prevent the face 40 of the second metal ring 36 from abutting the face 34 of the first metal ring 30.

Figure 6:
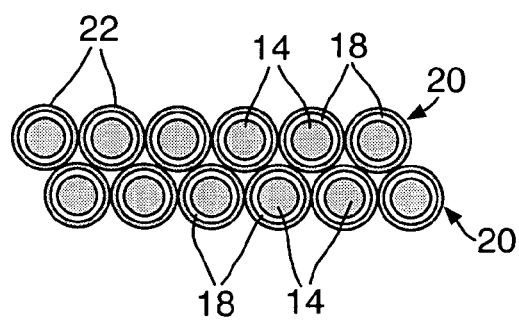
FIG. 6 is an enlarged cross-sectional view through the fibre preforms shown in FIG. 4 after softening of the glue.

A small quantity of a solvent, for the glue, is introduced into the annular groove 32 in order to soften the glue 22 and the second metal ring 36 is pressed towards the first metal ring 30 so as to move the individual metal coated ceramic fibres 14 of the annular fibre preforms 20, see FIG. 6. The metal coated ceramic fibres 14 of the annular spiral preforms 20 are able to move small distances while they are constrained by the adjacent annular spiral preforms 20 in order to move adjacent turns of the metal coated ceramic fibres 14 closer to, or into, plane to achieve a greater packing density of the metal coated ceramic fibres 14, which will allow the face 40 of the second metal ring 36 to abut the face 34 of the first metal ring 30, as shown in FIG. 7. The metal coated ceramic fibres 14 of each annular fibre preform 20 are closer to being planar and this reduces the risk of the metal coated ceramic fibres 14 moving out of position and crossing the metal coated ceramic fibres 14 of adjacent fibre preforms 20 and hence reducing the risk of damage, breakage, of the metal coated ceramic fibres 14 during the consolidation. The locally applied glue 22 is dispersed by the solvent so that the glue 22 is more widespread, but thinner, and then the glue 22 re-hardens. The glue 22 is then more easily removed later.

The radially inner and outer peripheries of the face 34 of the first metal ring 30 are sealed to the radially inner and outer peripheries of the face 40 of the second metal ring 36 to form a sealed assembly. The sealing is preferably by TIG welding, electron beam welding, laser welding or other suitable welding processes to form an inner annular weld seal 46 and an outer annular weld seal 48 as shown in FIG. 7.

The sealed assembly is evacuated using a vacuum pump and pipe 50 connected to the grooves, or chambers, 42 and 44. The sealed assembly is then heated, while being continuously evacuated to remove the glue 22 from the annular fibre preforms 20 and to remove the glue 22 from the sealed assembly.

After all the glue 22 has been removed from the annular fibre preforms 20 and the interior of the sealed assembly is evacuated, the pipe 50 is sealed. The sealed assembly is then heated and pressure is applied to the sealed assembly to produce axial consolidation of the annular fibre preforms 20 and diffusion bonding of the first metal ring 30 to the second metal ring 36 and diffusion bonding of the metal on the metal coated 18 ceramic fibres 14 to the metal on other metal coated 18 ceramic fibres 14, to the first metal ring 30 and to the second metal ring 36. During the application of heat and pressure the pressure acts equally from all directions on the sealed assembly, and this causes the annular projection 38 to move axially into the annular groove 32 to consolidate the annular fibre preforms 20.

The resulting consolidated and diffusion bonded ceramic fibre reinforced component is shown in FIG. 8 which shows the ceramic fibres 14 and the diffusion bond region 62. Additionally the provision of the annular grooves, or chambers, 42 and 44 allows the annular projection 38 to move during the consolidation process and in so doing this results in the formation of a recess 63 in the surface of what was the second metal ring 36. The recess 63 indicates that successful consolidation has occurred.

After consolidation and diffusion bonding the article 60 is machined to remove at least a portion of what was originally the first metal ring, at least a portion of the second metal ring and at least a portion of the diffusion bonded region. In the example the majority of the second metal ring and the majority of the diffusion bonded region is removed. Thus the fibre reinforced area is retained in it's intended shape with straight, flat, sides and thus the machining is in planes to produce flat, planar, surfaces on the article to provide a uniform distance between the surfaces and the fibre reinforced areas.

The article may then be machined for example by electrochemical machining or milling to form the integral compressor blades 16, as shown in FIG. 1, or the article may be machined to form one or more slots to receive the roots of the compressor blades.

Alternatively, compressor blades may be friction welded, laser welded or electron beam welded onto the article.

The reinforcing fibres may comprise alumina, silicon carbide, silicon nitride, boron or other suitable fibre.

The metal coating on the reinforcing fibre may comprise titanium, titanium aluminide, titanium alloy, aluminium, aluminium alloy, copper, copper alloy or any other suitable metal, alloy or intermetallic which is capable of being diffusion bonded.

The first metal ring and the second metal ring comprise titanium, titanium aluminide, titanium alloy, aluminium, aluminium alloy, copper, copper alloy or any other suitable metal, alloy or intermetallic which is capable of being diffusion bonded.

Figure 9:
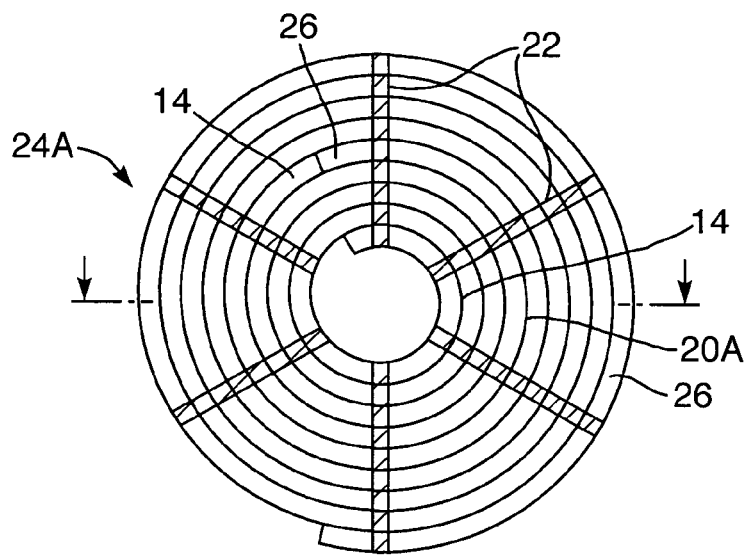
FIG. 9 is a plan view of a fibre and wire preform used in an alternative method of the present invention.
Figure 10:
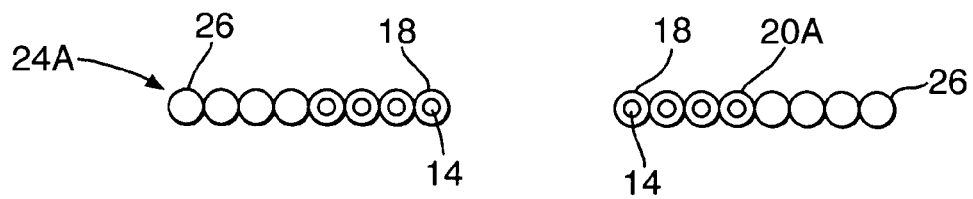
FIG. 10 is a cross-sectional view through the preform shown in FIG. 9.

Although the present invention has been described with reference to spirally wound metal coated fibres alone, the present invention is also applicable to the use of fibre preforms 20A comprising spirally wound metal coated 18 ceramic fibres 14 and wire preforms 24A comprising spirally wound metal wires 26, as shown in FIGS. 9 and 10. In FIGS. 9 and 10 each fibre preform 20A is arranged in the same plane as an associated wire preform 24A, but each wire preform 24A is at a greater diameter. The preforms 20A and 24A may be arranged in different planes.

Although the present invention has been described with reference to the introduction of a small quantity of solvent into the annular groove in the first metal ring to soften the glue on the annular fibre preforms, it is equally possible to flow solvent vapour or liquid solvent through the annular groove to soften the glue on the annular fibre preforms. A further alternative is to flow a hot fluid, for example argon or other inert gas or gas that is non reactive with the metal, through the annular chamber to soften the glue on the annular preforms. An additional alternative is to heat the first and second metal rings to a temperature sufficient to soften the glue on the annular fibre preforms.

Additionally the present invention is applicable to the use of spirally wound ceramic fibres and metal foils, helically wound ceramic fibres in a metal ribbon, spirally wound fibres and spirally wound metal wires or other form of metal filler.

The metal wire may comprise titanium, titanium aluminide, titanium alloy or any other suitable metal, alloy or intermetallic which is capable of being diffusion bonded. The metal foil, metal ribbon or other metal filler may comprise titanium, titanium aluminide, titanium alloy or any other suitable metal, alloy or intermetallic which is capable of being diffusion bonded.

Although the present invention has been described with reference to providing a circumferentially extending groove in an face of a first metal ring and a circumferentially extending projection on an face of a second metal ring it is equally applicable to the provision of a circumferentially extending groove on a radially outer or inner face of a ring. The circumferentially extending groove may be defined by a radially extending removable member. The present invention is also applicable to the use of a plurality of fibres, or metal coated fibres, extending in a single direction with the fibres, or metal coated fibres, being arranged in layers and with the layers being stacked upon each other.

The present invention is also applicable to any arrangement where the fibres are placed between two or more metal components.

Although the present invention has been described with reference to reinforcement of metal rings it is equally applicable to other arrangements and in such cases the reinforcing metal-coated fibres will be arranged accordingly.

Although the present invention has been described with reference to the placing of the filler metal and the ceramic fibres between two metal components and the diffusion bonding of the filler metal and two metal components, the filler metal and ceramic fibres may be placed between two tools but the filler metal is not bonded to the tools.

The advantages of the present invention is that it produces a higher "green" density of the fibre preforms which reduces volume changes during consolidation and hence controls the shape and position of the fibre reinforced area of the finished article. The higher "green" density maintains the positions of the metal-coated fibres and reduces the risk of metal-coated fibres moving out of position and subsequent breakage during consolidation. The smaller enclosed volume and the reduced excess space enables the use of a smaller and cheaper evacuation system. The ability to tolerate less than perfectly flat fibre preforms allows wider tolerances on the fibre winding equipment, which in turn avoids the need for high precision and expensive fibre winding equipment.

I claim:

1. A method of manufacturing a fibre reinforced metal matrix composite article, the method comprising the steps of:
    (a) forming a first metal component,
    (b) forming a second metal component,
    (c) forming at least one fibre preform, the fibre preform comprising at least one fibre, applying a glue to the fibre preform to hold the at least one fibre in position,
    (d) placing the at least one fibre preform and a filler metal between the first metal component and the second metal component,
    (e) softening the glue on the at least one fibre preform and simultaneously pressing the at least one fibre preform to increase the packing density of the at least one fibre preform,
    (f) sealing the second metal component to the first metal component,
    (g) removing the glue from the at least one fibre preform,
    (h) applying heat and pressure such as to consolidate the at least one fibre preform and the filler metal and to diffusion bond the filler metal, the first metal component and the second metal component to form a unitary composite component.

2. A method as claimed in claim 1 wherein step (a) comprises forming a groove in the first metal component, step (d) comprises placing the at least one fibre preform and the filler metal in the groove of the first metal component and placing the second metal component in the groove of the first metal component.

3. A method as claimed in claim 2 wherein step (b) comprises forming a projection on the second metal component and step (d) comprises placing the projection of the second metal component in the groove of the first metal component.

4. A method as claimed in claim 2 wherein step (a) comprises forming a circumferentially extending groove in an end face of the first metal member, step (d) comprises placing at least one circumferentially extending fibre preform and the filler metal in the circumferentially extending groove of the first metal component and placing the second metal component in the groove of the first metal component.

5. A method as claimed in claim 4 wherein step (c) comprises winding at least one fibre on a former to form a spiral fibre preform, applying a glue to the spiral fibre preform to hold the at least one fibre in position and removing the spiral fibre preform from the former.

6. A method as claimed in claim 5 wherein step (c) comprises winding a plurality of fibres on a former to form a plurality of spiral fibre preforms, applying a glue to each spiral fibre preform to hold each fibre in position and removing each spiral fibre preform from the former.

7. A method as claimed in claim 5 wherein the filler metal comprises at least one metal wire and the method comprises winding the at least one metal wire on a former to form a spiral wire preform, applying a glue to the spiral wire preform to hold the at least one metal wire in position and removing the spiral wire preform from the former.

8. A method as claimed in claim 7 wherein the at least one metal wire is a titanium wire, a titanium aluminide wire or a titanium alloy wire.

9. A method as claimed in claim 7 wherein the method includes winding a plurality of metal wires on a former to form a plurality of spiral wire preforms, applying a glue to each spiral wire preform to hold each metal wire in position and removing each spiral wire preform from the former.

10. A method as claimed in claim 1 wherein step (e) comprises softening the glue by introducing a solvent into the fibre preform.

11. A method as claimed in claim 10 wherein step (e) comprises softening the glue by introducing a small quantity of liquid solvent into the fibre preform.

12. A method as claimed in claim 10 wherein step (e) comprises softening the glue by flowing a liquid solvent, or a vaporised solvent, through the fibre preform.

13. A method as claimed in claim 1 wherein step (e) comprises softening the glue by heating the first and second metal components.

14. A method as claimed in claim 1 wherein step (e) comprises softening the glue by flowing a hot fluid through the fibre preform.

15. A method as claimed in claim 1 wherein the at least one fibre is a silicon carbide fibre, a silicon nitride fibre, a boron fibre or an alumina fibre.

16. A method as claimed in claim 15 wherein the at least one fibre is a metal coated fibre.

17. A method as claimed in claim 16 wherein the at least one metal coated fibre is a titanium coated fibre, a titanium aluminide coated fibre or a titanium alloy coated fibre.

18. A method of manufacturing a fibre reinforced metal matrix composite article, the method comprising the steps of:
 (a) forming a circumferentially and axially extending groove in an end face of a first metal component,
 (b) forming a circumferentially and axially extending projection on an end face of a second metal component,
 (c) winding at least one fibre on a former to form a spiral fibre preform, applying a glue to the spiral fibre preform to hold the at least one fibre in position and removing the spiral fibre preform from the former,
 (d) arranging the at least one spiral fibre preform and a filler metal in the circumferentially and axially extending groove in the first metal component,
 (e) placing the circumferentially and axially extending projection on the second metal component in the circumferentially and axially extending groove in the first metal component,
 (f) softening the glue on the at least one spiral fibre preform and simultaneously pressing the circumferentially and axially extending projection on the second metal component into the circumferentially and axially extending groove in the first metal component to increase the packing density of the at least one spiral fibre preform,
 (g) sealing the second metal component to the first metal component,
 (h) removing the glue from the at least one spiral fibre preform,
 (i) applying heat and pressure such that the circumferentially and axially extending projection moves into the circumferentially and axially extending groove to consolidate the at least one spiral preform and the filler metal and to diffusion bond the filler metal, the first metal component and the second metal component to form a unitary composite component.

19. A method as claimed in claim 18 wherein step (f) comprises introducing a solvent into the circumferentially and axially extending groove in the first metal component to soften the glue.

20. A method as claimed in claim 19 wherein step (f) comprises introducing a small quantity of liquid solvent into the circumferentially and axially extending groove in the first metal component.

21. A method as claimed in claim 19 wherein step (f) comprises flowing a liquid solvent, or a vaporised solvent, through the circumferentially and axially extending groove in the first metal component.

22. A method as claimed in claim 18 wherein step (f) comprises heating the first and second metal components to soften the glue.

23. A method as claimed in claim 18 wherein step (f) comprises flowing a hot fluid though the circumferentially and axially extending groove in the first metal component to soften the glue.

24. A method as claimed in claim 18 wherein the at least one fibre is a silicon carbide fibre, a silicon nitride fibre, a boron fibre or an alumina fibre.

25. A method as claimed in claim 24 wherein the at least one fibre is a metal coated fibre.

26. A method as claimed in claim 25 wherein the at least one metal coated fibre is a titanium coated fibre, a titanium aluminide coated fibre or a titanium alloy coated fibre.

27. A method as claimed in claim 18 wherein step (c) comprises winding a plurality of fibres on a former to form a plurality of spiral fibre preforms, applying a glue to each spiral fibre preform to hold each fibre in position and removing each spiral fibre preform from the former.

28. A method as claimed in claim 18 wherein the filler metal comprises at least one metal wire and the method comprises winding the at least one metal wire on a former to form a spiral wire preform, applying a glue to the spiral wire preform to hold the at least on ~metal wire in position and removing the spiral wire preform from the former.

29. A method as claimed in claim 28 wherein the at least one metal wire is a titanium wire, a titanium aluminide wire or a titanium alloy wire.

30. A method as claimed in claim 28 wherein the method includes winding a plurality of metal wires on a former to form a plurality of spiral wire preforms, applying a glue to each spiral wire preform to hold each metal wire in position and removing each spiral wire preform from the former.

31. A method as claimed in claim 18 wherein the first metal component and the second metal component comprise titanium, titanium aluminide or titanium alloy.

32. A method of manufacturing a fibre reinforced metal matrix composite rotor, the method comprising the steps of:
 (a) forming a circumferentially and axially extending groove in an end face of a first metal component;
 (b) forming a circumferentially and axially extending projection on an end face of a second metal component;

(c) winding at least one fibre on a former to form a spiral fibre preform, applying a glue to the spiral fibre preform to hold the at least one fibre in position and removing the spiral fibre preform from the former;

(d) arranging the at least one spiral fibre preform and a filler metal in the circumferentially and axially extending groove in the first metal component, (e) placing the circumferentially and axially extending projection on the second metal component in the circumferentially and axially extending groove in the first metal component;

(f) softening the glue on the at least one spiral fibre preform to allow the at least one fibre to move and simultaneously pressing the circumferentially and axially extending projection on the second metal component into the circumferentially and axially extending groove in the first metal component to increase the packing density of the at least one spiral fibre perform;

(g) allowing the glue to harden;

(h) sealing the second metal component to the first metal component by welding together inner and outer peripheries of faces of the first and second metal components;

(i) removing the glue from the at least one spiral fibre perform, and (j) applying heat and pressure such that the circumferentially and axially extending projection moves into the circumferentially and axially extending groove to consolidate the at least one spiral preform and the filler metal and to diffusion bond the filler metal, the first metal component and the second metal component to form a composite rotor.

* * * * *